(12) United States Patent  
Jiang

(10) Patent No.: US 12,238,240 B2
(45) Date of Patent: Feb. 25, 2025

(54) METHOD AND DEVICE FOR DISPLAYING VIDEO PLAYBACK INTERFACE, TERMINAL DEVICE, AND STORAGE MEDIUM

(71) Applicant: Beijing Bytedance Network Technology Co., Ltd., Beijing (CN)

(72) Inventor: Feng Jiang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 312 days.

(21) Appl. No.: 17/753,247

(22) PCT Filed: Sep. 2, 2020

(86) PCT No.: PCT/CN2020/112969
§ 371 (c)(1),
(2) Date: Feb. 24, 2022

(87) PCT Pub. No.: WO2021/047432
PCT Pub. Date: Mar. 18, 2021

(65) Prior Publication Data
US 2022/0368798 A1    Nov. 17, 2022

(30) Foreign Application Priority Data
Sep. 9, 2019   (CN) .......................... 201910849771.0

(51) Int. Cl.
*H04M 1/72463* (2021.01)
*G06F 21/10* (2013.01)
(Continued)

(52) U.S. Cl.
CPC ...... *H04M 1/724634* (2022.02); *G06F 21/10* (2013.01); *G06F 21/31* (2013.01); *H04M 1/72469* (2021.01)

(58) Field of Classification Search
None
See application file for complete search history.

(56) References Cited

U.S. PATENT DOCUMENTS 10,621,317 B1 *   4/2020   Sardari .................. G06F 21/83
2016/0249172 A1 *   8/2016   Xin ........................ G06F 16/435

FOREIGN PATENT DOCUMENTS

CN    101268639 A    9/2008
CN    103019783 A    4/2013
(Continued)

OTHER PUBLICATIONS

Chinese First Office Action issued in Chinese Application No. 201910849771.0 on Feb. 3, 2021.
(Continued)

*Primary Examiner* — Frantz Bataille
(74) *Attorney, Agent, or Firm* — Astute IP Law Group

(57) ABSTRACT

This disclosure discloses a display method and apparatus for a video playing interface, a terminal device, and a storage medium. The display method of the video playing interface includes: receiving, in a screen locking state of a terminal device, a video playing instruction of a user for a screen locking interface of the terminal device; and switching, in response to the video playing instruction, from the screen locking interface to a video playing interface displayed according to a video playing program in the screen locking state, wherein through the video playing program, a video list is displayed or video data is played in the video playing interface in the screen locking state.

19 Claims, 5 Drawing Sheets

(51) Int. Cl.
    *G06F 21/31*      (2013.01)
    *H04M 1/72469*    (2021.01)

(56)         References Cited

FOREIGN PATENT DOCUMENTS

| CN | 103297410 A | 9/2013 |
| CN | 103412751 A | 11/2013 |
| CN | 105094679 A | 11/2015 |
| CN | 105487747 A | 4/2016 |
| CN | 105491050 A | 4/2016 |
| CN | 105871804 A | 8/2016 |
| CN | 105892793 A | 8/2016 |
| CN | 106648325 A | 5/2017 |
| CN | 106713596 A | 5/2017 |
| CN | 107172282 A | 9/2017 |
| CN | 107402688 A | 11/2017 |
| CN | 108259314 A | 7/2018 |
| CN | 109803166 A | 5/2019 |
| CN | 109933273 A | 6/2019 |
| CN | 110475152 A | 11/2019 |
| CN | 111460424 A | 7/2020 |
| JP | 2017216716 A | 12/2017 |

OTHER PUBLICATIONS

Chinese Second Office Action issued in Chinese Application No. 201910849771.0 on Sep. 3, 2021.
International Written Opinion issued in International Patent Application No. PCT/CN2020/112969 on Dec. 7, 2020.

* cited by examiner

METHOD AND DEVICE FOR DISPLAYING VIDEO PLAYBACK INTERFACE, TERMINAL DEVICE, AND STORAGE MEDIUM

CROSS-REFERENCE TO RELATED APPLICATIONS

This patent application is a 35 U.S.C. § 371 National Phase of PCT Application No. PCT/CN2020/112969, filed on Sep. 2, 2020, which claims the priority to the Chinese patent application No. 201910849771.0 filed on Sep. 9, 2019 and entitled "video playing method, apparatus, terminal device and computer-readable storage medium", the entirety of which is hereby incorporated into the present disclosure by reference and taken as part of the present disclosure.

TECHNICAL FIELD

The present disclosure relates to the field of video playing technologies, and particularly, to a display method and apparatus for video playing interface, a terminal device, and a computer-readable storage medium.

BACKGROUND

In the related art, in order to protect privacy of a user or avoid a mistaken operation of the user for a terminal device, the terminal device generally has a screen locking function capable of displaying a screen locking interface with relatively fixed content. For the terminal device in a screen locking state, if the user needs to use the terminal device to perform video browsing or playing, he/she often needs to perform a series of operations such as unlocking the device, searching for and opening an installed video application.

Methods described in this section are not necessarily methods having been previously conceived or adopted. Unless otherwise specified, it should not be assumed that any of the methods described in this section is considered as prior art merely by virtue of its inclusion in this section. Similarly, problems mentioned in this section should not be considered as having been widely acknowledged in any prior art, unless otherwise specified.

SUMMARY

According to an aspect of the present disclosure, there is provided a display method of a video playing interface, comprising: receiving, in a screen locking state of a terminal device, a video playing instruction of a user for a screen locking interface of the terminal device; and switching, in response to the video playing instruction, from the screen locking interface to a video playing interface displayed according to a video playing program in the screen locking state, wherein through the video playing program, a video list is displayed or video data is played in the video playing interface in the screen locking state.

According to another aspect of the present disclosure, there is provided an apparatus for display of a video playing interface, comprising: an instruction receiving unit configured to receive, in a screen locking state of a terminal device, a video playing instruction of a user for a screen locking interface of the terminal device; and an interface switching unit configured to switch, in response to the video playing instruction, from the screen locking interface to a video playing interface displayed according to a video playing program in the screen locking state, wherein through the video playing program, a video list is displayed or video data is played in the video playing interface in the screen locking state.

According to another aspect of the present disclosure, there is provided a terminal device, comprising: a processor; and a memory having therein stored a program, the program comprising instructions which, when executed by the processor, cause the processor to perform the method described in the present disclosure.

According to another aspect of the present disclosure, there is provided a computer-readable storage medium having therein stored a program, the program comprising instructions which, when executed by a processor of an electronic device, cause the electronic device to perform the method described in the present disclosure.

According to another aspect of the present disclosure, there is provided a computer program product comprising a program, the program comprising code which, when executed by a processor of an electronic device, causes the electronic device to perform the method described in the present disclosure.

More features and advantages of the present disclosure will become apparent from exemplary embodiments descried below in conjunction with the accompanying drawings.

BRIEF DESCRIPTION OF THE DRAWINGS

The accompanying drawings exemplarily illustrate embodiments and constitute a part of this specification, and together with the textual description of this specification, serve to explain exemplary implementations of the embodiments. The illustrated embodiments are for purposes of example only and do not limit the scope of the claims. In all the drawings, identical reference numbers denote similar, but not necessarily identical, elements.

DETAILED DESCRIPTION

Figure 1:
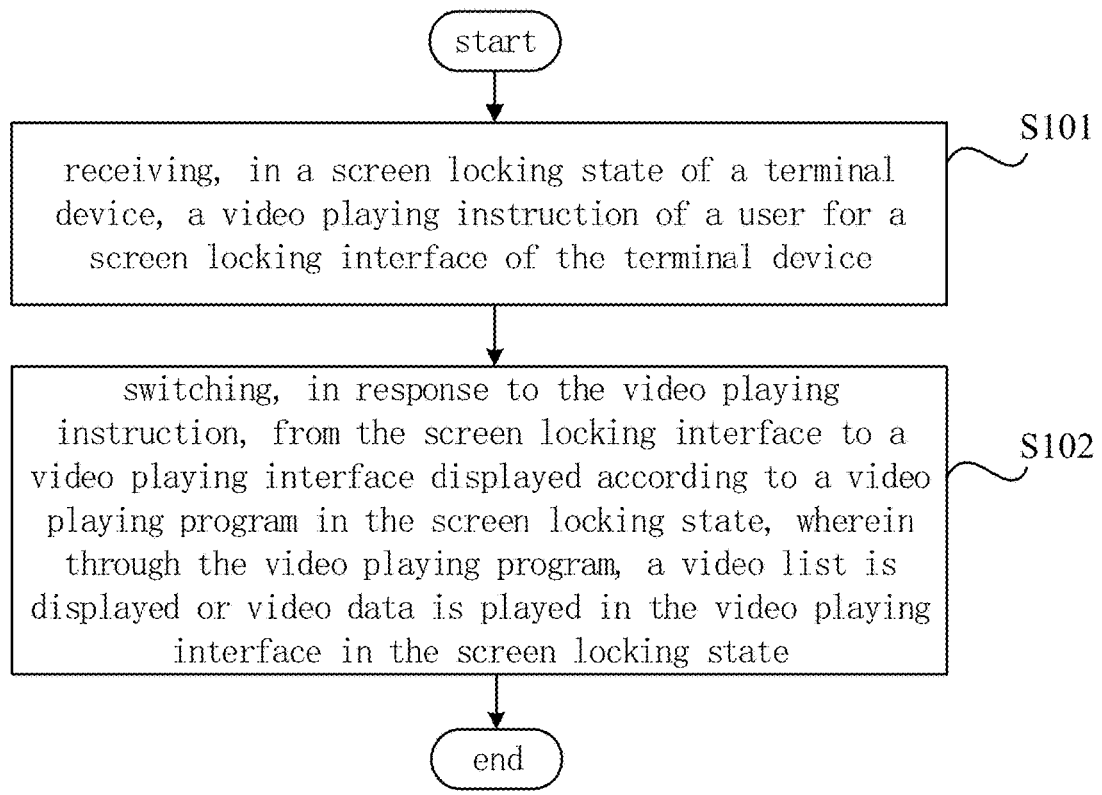
FIG. 1 is a flowchart illustrating a display method of a video playing interface according to an exemplary embodiment of the present disclosure.

Embodiments of the present disclosure will be described in more detail below with reference to the accompanying drawings. While certain embodiments of the present disclosure are shown in the drawings, it should be understood that the present disclosure can be implemented in various forms and should not be construed as limited to the embodiments set forth herein, but rather these embodiments are provided for a more thorough and complete understanding of the present disclosure. It should be understood that the drawings and the embodiments of the present disclosure are for exemplary purposes only and are not intended to limit the scope of the present disclosure.

It should be understood that various steps recited in a method implementation of the present disclosure can be performed in a different order, and/or in parallel. Moreover, the method implementation can include additional steps and/or omit performing the illustrated steps. The scope of the present disclosure is not limited in this respect.

A term "comprising" and variations thereof, which are used herein, are intended to be open-minded, i.e., "including but not limited to". A term "based on" is "at least in part based on". A term "one embodiment" means "at least one embodiment"; a term "another embodiment" means "at least one other embodiment"; and a term "some embodiments" means "at least some embodiments". Relevant definitions of other terms will be given in the following description.

It should be noted that in this disclosure, unless otherwise specified, the use of terms "first", "second", and the like to describe various elements is not intended to define a position relation, a temporal relation, or an importance relation of these elements, and such terms are used only for distinguishing one element from another. In some examples, a first element and a second element can refer to a same instance of the element, while in some cases they can also refer to different instances based on the context description.

In addition, terms used in the description of various described examples in this disclosure are for the purpose of describing specific examples only and are not intended to be limiting. Unless clearly specified in the context otherwise, if the number of elements is not specifically defined, the element can be one or more. Furthermore, a term "and/or" as used in this disclosure is intended to encompass any and all possible combinations of listed items.

Further, it should be noted that names of messages or information interchanged between a plurality of devices in the implementation of the present disclosure are for illustrative purposes only, and are not intended to limit the scope of these messages or information.

In the related art, for a terminal device in a screen locking state, if a user needs to use the terminal device to perform video browsing or playing, he often needs to perform a series of operations such as unlocking the device, searching for and opening an installed video application. In other words, unless the terminal device in the screen locking state is subjected to the unlocking operation, the operations such as searching for and starting the video application, and the like, the user cannot use the terminal device in the screen locking state to browse or play video data. Therefore, if the user wishes to start video browsing or playing in the screen locking state, the operation flow is complex, and user experience is poor.

The present disclosure provides a display method of a video playing interface, which can, according to a video playing instruction initiated by a user for a screen locking interface of a terminal device in the screen locking state, switch from the screen locking interface to a video playing interface displayed according to a video playing program in the screen locking state, so as to, through the video playing program, display a video list or play video data in the video playing interface in the screen locking state. Exemplary embodiments of the display method of the video playing interface of the present disclosure will be further described below with reference to the accompanying drawings.

FIG. 1 is a flowchart illustrating a display method of a video playing interface according to an exemplary embodiment of the present disclosure. As shown in FIG. 1, the display method of the video playing interface can comprise, for example, the following steps of: receiving, in a screen locking state of a terminal device, a video playing instruction of a user for a screen locking interface of the terminal device (step S101); and switching, in response to the video playing instruction, from the screen locking interface to a video playing interface displayed according to a video playing program in the screen locking state (step S102). Through the video playing program, a video list is displayed or video data is played in the video playing interface in the screen locking state.

According to the display method of the video playing interface shown in the flowchart of FIG. 1, there is no need to perform a series of operations such as unlocking the device, manually searching for and opening an installed video application, and the like, so that a operation flow of performing video browsing or playing for the terminal device in the screen locking state can be simplified. Since video contents can be displayed or played to the user without unlocking, it is convenient for the user to browse video data by using various fragment time, so that the device use experience of the user can be improved. In addition, the display method of the video playing interface provided by the present disclosure does not change the screen locking state of the terminal device, and thus it can also ensure the privacy security of the user while facilitating the use of the user.

In this disclosure, the "terminal device" can be any type of terminal device, which can be, for example, but is not limited to, a mobile terminal such as a mobile phone, a notebook computer, a digital broadcast receiver, a PDA (personal digital assistant), a PAD (tablet computer), a PMP (portable multimedia player), a vehicle-mounted terminal (for example, a vehicle-mounted navigation terminal), and the like, and a fixed terminal such as a digital TV, a desktop computer, and the like.

In this disclosure, the "screen locking state" refers to a state in which a display screen of the terminal device is locked. In the screen locking state, most programs having already run in the terminal device will be in a pause state and covered by the screen locking interface. In the screen locking state, a screen locking program in system applications can run, and the user needs to input a preset password or other unlocking information into the terminal device to unlock the terminal device so as to use other programs or applications. Therefore, the screen locking state can achieve purposes of effectively protecting the data security of the terminal device and protecting the privacy of the user.

In this disclosure, the "screen locking interface" refers to an interface presented to the user and used for protecting the privacy of the user as the screen of the terminal device is lit in the screen locking state. Compared with a user desktop in an unlocking state, content displayed in the screen locking interface is relatively less and relatively fixed.

According to some embodiments, the screen locking interface can be a screen locking main interface of the terminal device, i.e., an interface presented to the user by the terminal device for the first time after the screen of the terminal device in the screen locking state is lit by the user. In addition, according to some embodiments, if the terminal device is provided with a plurality of screen locking sub-interfaces including the screen locking main interface, the screen locking interface described in the present disclosure can be the screen locking main interface or another screen locking sub-interface different from the screen locking main interface.

According to some embodiments, in the step S101, the video playing instruction is implemented through a user input for the screen locking interface. The user input can include, for example: a screen swipe operation, button input, voice input, face image input (i.e., facial image input), or any combination thereof. For example, taking an example that the screen swipe operation includes a screen swipe-up operation, the user can initiate the video playing instruction by performing simple screen swipe-up for the screen locking interface of the terminal device, so as to implement switching between the screen locking interface and the video playing interface displayed according to the video playing program in the screen locking state, so that the user operation is simpler and more convenient.

According to some embodiments, the screen swipe operation is not limited to the screen swipe-up operation, and can also be set as screen swipe-down or a swipe operation in another direction according to an actual situation, as long as the screen swipe operation set for implementing the video playing instruction and a swipe operation for implementing another instruction (for example, unlocking) for the screen locking interface do not conflict with each other. For example, if any corresponding instruction is not defined for a swipe-right operation for the screen locking interface, the swipe-right operation for the screen locking interface can be taken as the screen swipe operation for implementing the video playing instruction.

According to some embodiments, in the step S101, the video playing instruction can further be implemented in response to a user input for the screen locking interface and a user authentication success. The user input can include, for example: a screen swipe operation, button input, voice input, face image input (i.e., facial image input), or any combination thereof, and the user authentication success can include, for example: biometric identification authentication success, password authentication success, question-and-answer authentication success, or any combination thereof. The biometric identification authentication success can include, for example, at least one of: facial identification authentication success, fingerprint identification authentication success, and iris identification authentication success.

In other words, in order to protect the device security of the user, the user input for the screen locking interface can further be combined with an authentication operation to generate the video playing instruction. According to some implementations, the combination herein can be the case of the user input first and then the authentication operation such as facial identification, fingerprint identification, password authentication, etc., and of course, it is not limited thereto. For example, for a combination of a screen swipe operation and facial identification authentication, it can also be the facial identification authentication first and then the screen swipe operation. In some cases, the user input and the authentication can be accomplished by a same user action. For example, a user can accomplish the user input and initiate and accomplish off-screen fingerprint authentication by pressing a predetermined button on the screen.

Exemplarily, taking the user input being the screen swipe operation as an example, the receiving the video playing instruction of the user for the screen locking interface can comprise: receiving a screen swipe operation of the user for the screen locking interface; and in response to the user authentication success, determining that the video playing instruction of the user for the screen locking interface has been received.

According to some embodiments, a video playing button is disposed in the screen locking interface, and the user input such as the screen swipe operation, the button input, and the like, can be performed based on the video playing button. Accordingly, the receiving the video playing instruction of the user for the screen locking interface can comprise: receiving a screen swipe operation performed by the user based on the video playing button disposed in the screen locking interface; in response to the screen swipe operation of the user based on the video playing button, displaying an authentication interface for playing a video; receiving authentication information inputted by the user for the authentication interface for playing the video; and in response to an authentication success, determining that the video playing instruction of the user for the screen locking interface has been received.

Figure 2:
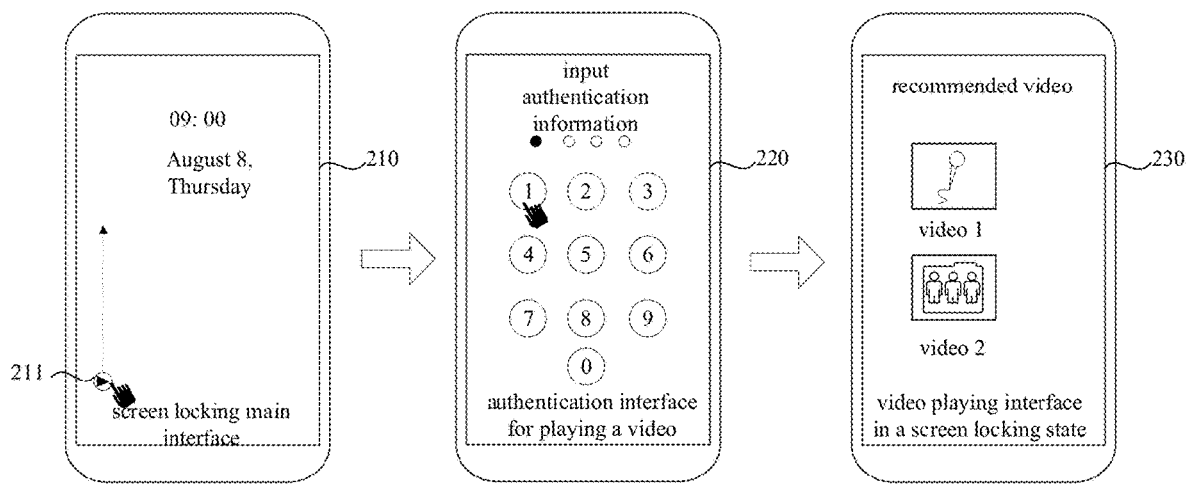
FIG. 2 is a schematic diagram illustrating receiving a video playing instruction of a user for a screen locking interface of a terminal device, and based on the video playing instruction, switching from the screen locking interface to a video playing interface displayed according to a video playing program in a screen locking state, according to an exemplary embodiment of the present disclosure.

For example, FIG. 2 illustrates a schematic diagram of receiving a video playing instruction of a user for a screen locking interface of a terminal device, and based on the video playing instruction, switching from the screen locking interface to a video playing interface displayed according to a video playing program in a screen locking state according to an exemplary embodiment of the present disclosure. In an example shown in FIG. 2, a video playing button 211 is disposed in the screen locking interface of the terminal device, for example, at a lower left corner (which can further be another position such as a lower right corner, as long as the settings of other buttons in the screen locking interface are not affected) of a screen locking main interface 210. If the user wants to use the terminal device in the screen locking state to perform video playing, the user input can be performed based on the video playing button 211, for example, a swipe operation such as screen swipe-up is performed in a case of holding down a video playing button 211. In response to the screen swipe-up operation, the terminal device can display one authentication interface 220 for playing a video. Thereafter, the user can input corresponding authentication information for the authentication interface 220 for playing the video, and the authentication information can be, but is not limited to, a digital password, a fingerprint password, or a gesture password, etc. In response to an authentication success of the authentication information, the terminal device will be switched from the screen locking main interface 210 to a video playing interface 230 displayed according to the video playing program in the screen locking state.

According to some implementations, the above successfully authenticated authentication information of the authentication interface 220 for playing the video can be the same information as unlocking information required for an unlocking operation of the terminal device, and of course, it can also be different information. In addition, a degree and angle of the above swipe operation such as screen swipe-up are not limited. Taking the screen swipe-up operation as an example, as long as a longitudinal (i.e. a direction where a screen major axis of the terminal device is) distance of a final position of a user's finger or the like after the swipe-up relative to an original position of the video playing button 211 is greater than a distance threshold set according to the actual situation, so as to simplify the user operation and enhance the use experience of the user. According to some embodiments, the video playing button 211 can be set to an arbitrary shape capable of more intuitively reflecting the video playing function, for example, a circle with an inverted triangle disposed in the middle as shown in FIG. 2, and the like.

According to some embodiments, the video playing program can be a sub-program contained in a screen locking program of the terminal device. In other words, in response to the video playing instruction, the screen locking program of the terminal device can control the terminal device to switch from the screen locking interface to a video playing interface displayed according to a video playing program contained in the screen locking program in the screen locking state. Therefore, even if any third-party video playing program is not installed in the terminal device, video browsing and/or playing in the screen locking state can be implemented. In this disclosure, the third-party video playing program includes an application supported by a video content server and different from the system application (i.e., system program) of the terminal device, and the screen locking program is contained in the system application. The video content server can include, for example, one or more servers for aggregation and distribution of video contents. According to some implementations, the video content server can be, for example, a cloud platform, which comprises a plurality of cloud servers. Thus, compared with the related art, the user operation can be easier and the user's use adhesiveness to the terminal device can be enhanced. In addition, since there is no need to install the third-party video playing program, more space occupied by the third-party video playing program of the terminal device can further be saved, so that the overall running performance of the terminal device is improved.

According to some embodiments, the switching from the screen locking interface to the video playing interface displayed according to the video playing program contained in the screen locking program in the screen locking state does not need to involve switching between processes, but can be implemented by additionally starting one thread in a process of the screen locking program.

Figure 3:
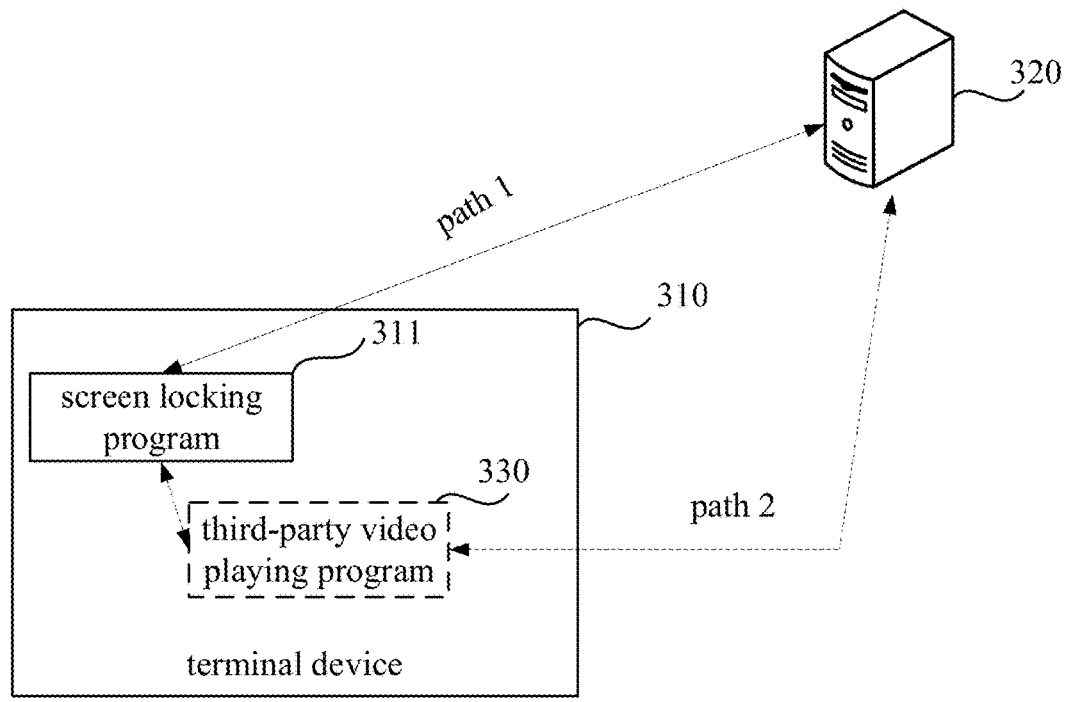
FIG. 3 is a diagram illustrating a path of acquiring, by a terminal device, a video list or video data from a video content server according to an exemplary embodiment of the present disclosure.

A scene where the video playing program can be a sub-program contained in a screen locking program of the terminal device will be described below with reference to FIG. 2 and FIGS. 3 and 4, where FIG. 3 illustrates a schematic diagram of a path of acquiring, by a terminal device, a video list or video data from a video content server according to an exemplary embodiment of the present disclosure, and FIG. 4 illustrates a schematic diagram of associating a registered account of a user for a third-party video playing program with a unique video service registration identifier of a terminal device.

According to some embodiments, as shown in FIG. 2, the video playing interface can cover the entire display screen of the terminal device, or can also cover only a part of the display screen of the terminal device. In addition, since the video playing program contained in the screen locking program is a sub-program of the screen locking program (which is the system program of the terminal device), the video playing interface in the screen locking state can be equivalent to one sub-interface of the screen locking interface of the terminal device, for example, it can be equivalent to one screen locking sub-interface different from the screen locking main interface.

According to some embodiments, the video list or the video data can be acquired by the screen locking program from the video content server based on a unique video service registration identifier (for example, a user ID of the terminal device registered in the video content server) of the terminal device. That is, the video content server can, in units of terminal devices, provide a required video list or video data for each terminal device that displays a video list or plays video data in a video playing interface in a screen locking state, through a video playing program contained in a screen locking program.

According to some embodiments, the unique video service registration identifier of the terminal device is an identifier assigned by the video content server to the terminal device based on a unique device identifier of the terminal device. The unique device identifier can include, for example, fingerprint information and/or physical address information of the terminal device.

According to some embodiments, the video list can be displayed in the video playing interface in the screen-locking state. As shown in FIG. 2, video contents in the video list can be presented to the user in a form of thumbnails. In this case, the user can select a corresponding video content for playing by browsing up and down and clicking a video content of interest. In addition, after the user selects the corresponding video content for playing, various common video playing control buttons, for example, back, pause, etc., control buttons, can further be displayed in the displayed video playing sub-interface.

According to some embodiments, the video data can also be directly played in the video playing interface in the screen locking state. In other words, video data of video contents in which the user may be interested can be directly pushed and played, and the playing of a next video content is continued after the playing of one video content is finished. In this case, the user can also trigger a "next video content" control disposed in the video playing interface to select terminating the currently played video content and play a next video content.

According to some embodiments, the screen locking program can, through direct communication with the video content server, directly acquire the video list or the video data from the video content server. For example, as shown in FIG. 3, for a scene where the video playing program can be a sub-program contained in a screen locking program of the terminal device, a screen locking program 311 of a terminal device 310 can, through a path 1 in FIG. 3, directly acquire a corresponding video list or video data from a video content server 320, without passing through and installing any third-party video playing program 330 (a dashed box in FIG. 3 indicates that the third-party video playing program may not be installed), so that the transmission path of the video data can be simplified, which improves the device use experience of the user.

According to some embodiments, the unique video service registration identifier of the terminal device can be assigned to the terminal device by the video content server after determining that authentication of a system application identifier (for example, an APP ID of the system application registered in the video content server) reported by the terminal device has been passed. The system application identifier can include, for example, a unique application identifier assigned by the video content server to the system application of the terminal device. Therefore, the terminal device can acquire the corresponding video list or video data after a two-layer identifier authentication (i.e., system-application-layer identifier authentication and terminal-device-layer identifier authentication) of the video content server, so as to ensure the security of the user information and the user device.

According to some embodiments, the video list displayed or the video data played in the video playing interface can be pushed based on a general non-personalized parameter and/or user information corresponding to the unique video service registration identifier. The general non-personalized parameter can include, for example, at least one of parameters independent of user information, such as click-through rate, page view, video view, user rating, etc. of the video content. The user information can include, for example, at least one type of the following information: user's personal information (for example, nickname, sex, age and the like), user's playing history data (for example, which types, styles, regions, actors and/or themes of video contents have been played and their corresponding playing times or frequencies, etc.) for video contents, user's playing behavior information (for example, playing frequencies, playing time and the like) for video contents, user's preference information (for example, which types, styles, regions, actors and/or themes of video contents are preferred) for video contents, user's preference information (for example, user's preferences for advertisement information) for information recommendation contents, and video playing setting information (for example, volume, brightness, definition, language, subtitle and the like).

In other words, based on the general non-personalized parameter, for example, parameters such as click-through rate, page view, video view, user rating, and the like of each video content, the video playing program or the video content server can push, to the user of the terminal device, a video content (for example, a mainstream video content in a current time period) with the click-through rate, page view, video view, user rating, or a weighted combination value of the above at least two types of parameters, which is greater than a set threshold, wherein when the weighted combination value is considered for video content recommendation, a weight of each parameter involved in a corresponding parameter combination and a threshold involved can be flexibly set according to the actual situation. Alternatively, the video content can further be pushed based on or in conjunction with the user information corresponding to the unique video service registration identifier. For example, if a user often plays one certain type (for example, a technology type) of video contents for pushed video contents or video contents in a video list, but does not play or skips other types of video contents, the push of this type of video contents can be increased. According to some implementations, if the video content is pushed based on the general non-personalized parameter and the user information corresponding to the unique video service registration identifier, an initial value of a weight (i.e., a weight of the user information in a parameter combination on which a push strategy is based) of the user information in the push strategy can be relatively less, for example, it can be less than a weight of the general non-personalized parameter in the push strategy. In addition, the weight of the user information in the push strategy can be gradually increased with an increase of the amount of data of the user information, for example, as the user uses the video playing program to play or browse video contents more and more times, the weight of the user information in the push strategy can be greater and greater, for example, it can be gradually increased to be equal to or even greater than the weight of the general non-personalized parameter in the push strategy. In this way, it is more convenient to realize the accuracy and personalized push of video contents.

According to some embodiments, video browsing or playing information of a video content displayed in the video playing program and video browsing or playing information of the video content stored in the video content server can be synchronized. The video browsing or playing information can include, for example, click-through rate or video view of a specific video content, etc. Therefore, through video browsing or playing information of a certain video content displayed in the video playing program, the terminal device can synchronize video browsing or playing information of the video content stored in the video content server. On the other hand, video browsing or playing information such as clicking or viewing the video content based on the unique video service registration identifier and through the video playing program, can also be collected by the video content server and reflected in video browsing or playing information of the video content displayed in a third-party video playing program supported by the video content server. Therefore, even if the video content is played through the video playing program contained in the screen locking program of the terminal device, the user can also see a total click-through rate or video view of the video content. On the other hand, a behavior of playing the video content through the video playing program contained in the screen locking program of the terminal device can also be counted into the total click-through rate or the video view of the video, and therefore, the click-through rate or the video view of the video content itself can be increased.

For example, in a case where the video content is played by the video playing program contained in the screen locking program of the terminal device, not only video data of the video content is acquired from the video content server, but also video browsing or playing information (for example, click-through rate or video view) of the video content can be acquired from the video content server and displayed. On the other hand, in the case where the video content is played through the video playing program contained in the screen locking program of the terminal device, the screen locking program of the terminal device further sends information related to this playing behavior of playing the video content to the video content server. The video content server can, according to the information related to this playing behavior of the video content, update the video browsing or playing information (for example, click-through rate or video view) of the video content, and display the updated video browsing or playing information (for example, click-through rate or video view) through its supported third-party video playing program.

According to some embodiments, the display method of the video playing interface can further comprise: receiving an account association instruction of the user for the video playing interface; and in response to the account association instruction, associating a registered account of the user for the third-party video playing program with the unique video service registration identifier of the terminal device. Such association can be performed even if the terminal device does not have therein installed the third-party video playing program or has therein uninstalled the third-party video playing program. Therefore, the third-party video playing program and the two different account systems corresponding to the terminal device can be associated with each other, so that when the user plays a video content through the video playing program contained in the screen locking program of the terminal device, he can also have playing experience (for example, having browsed his own interested content) similar to playing experience of playing, by the user, the video content with the registered account by using the third-party video playing program.

According to some embodiments, in response to the account association instruction, the associating the registered account of the user for the third-party video playing program with the unique video service registration identifier of the terminal device comprises: in response to the account association instruction, calling and displaying a login interface of the third-party video playing program; receiving login authentication information which is input into the login interface by the user for the third-party video playing program and corresponds to the registered account; and in response to an authentication success based on the login authentication information, associating the registered account with the unique video service registration identifier of the terminal device. According to some embodiments, the login authentication information can include, for example, at least one type of the registered account, a password corresponding to the registered account, a verification code, biometric authentication information, and question-and-answer information. The password can be, for example, but is not limited to, a numeric and/or alphabetic password, a gesture password, or the like.

Figure 4A:
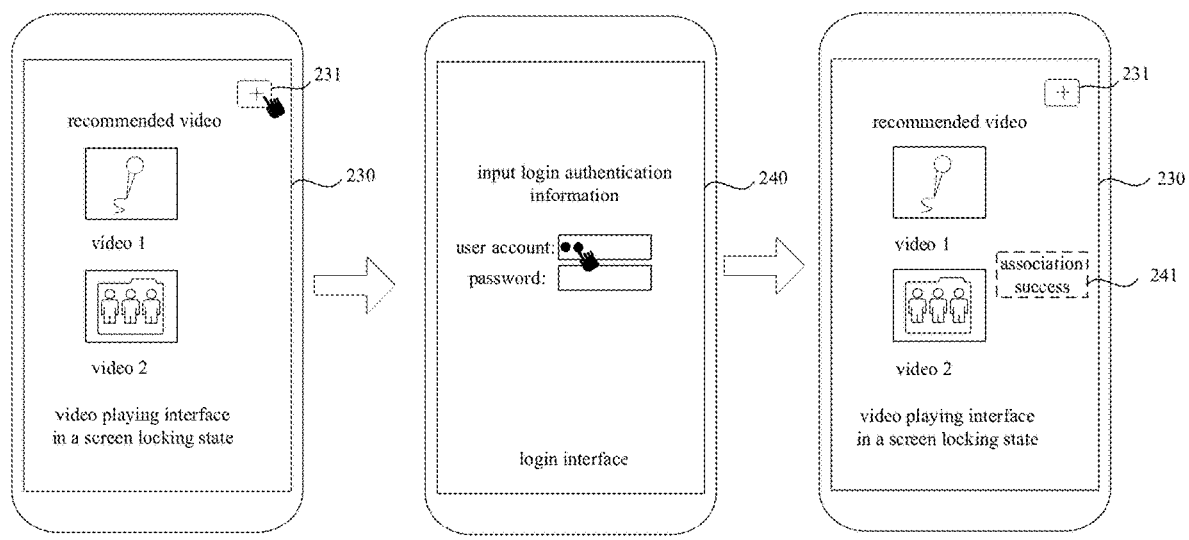
FIGS. 4A and 4B are schematic diagrams illustrating associating a registered account of a user for a third-party video playing program with a unique video service registration identifier of a terminal device according to an exemplary embodiment of the present disclosure.

According to some embodiments, an account association button can be disposed in the video playing interface; and the account association instruction can be initiated based on the account association button. For example, in an account association example shown in FIG. 4A, an account association button 231 is disposed at an upper right corner (which can further be another position such as an upper left corner, a lower left corner, and a lower right corner, as long as the settings of other buttons in the screen locking interface are not affected) of the video playing interface 230 of the terminal device. The account association instruction can be initiated by the user by triggering (for example, clicking) the account association button 231. In response to the account association instruction, the terminal device will call and display a login interface 240 of a third-party video playing program; the user can input, into the login interface 240, a registered account of the third-party video playing program and a password or other login authentication information; and in response to an authentication success of the registered account and the password or other login authentication information input by the user, the terminal device can associate the registered account of the third-party video playing program with the unique video service registration identifier of the terminal device. According to some embodiments, as shown in FIG. 4A, in response to an authentication success of the registered account and the password or other login authentication information input by the user, the interface can be switched back to the previously displayed video playing interface 230, and can return, to the user, a corresponding response message for indicating that the registered account is successfully associated with the unique video service registration identifier, through various prompts, such as a pop-up message box 241.

According to some embodiments, the account association instruction can further be implemented in response to a user triggering for the account association button and a response message that the registered account has not been associated with the unique video service registration identifier of the terminal device. In other words, in the account association example shown in FIG. 4A, when a triggering operation of the user for the account association button 231 has been received, it can be first judged whether the registered account has been associated with the unique video service registration identifier of the terminal device, and in response to the registered account having not been associated with the unique video service registration identifier of the terminal device, it is determined that the account association instruction has been received, and the login interface 240 of the third-party video playing program is called and displayed. In this way, operation redundancy and resource consumption caused by repeated account association can be reduced, which improves the application experience of the user.

As an alternative, a control related to user interaction can be displayed in the video playing interface, and the account association instruction can be initiated based on the control related to user interaction. According to some embodiments, the control related to user interaction is in a disabled state, and the account association instruction can be implemented through a user triggering for the control related to user interaction in the disabled state. According to some embodiments, the control related to user interaction in the disabled state can be displayed in a special style such as gray or being surrounded or covered by a shadow area, so as to be distinguished from a common style of a control related to user interaction in an enabled state. Of course, the control related to user interaction in the disabled state can also be displayed in a common style.

Figure 4B:
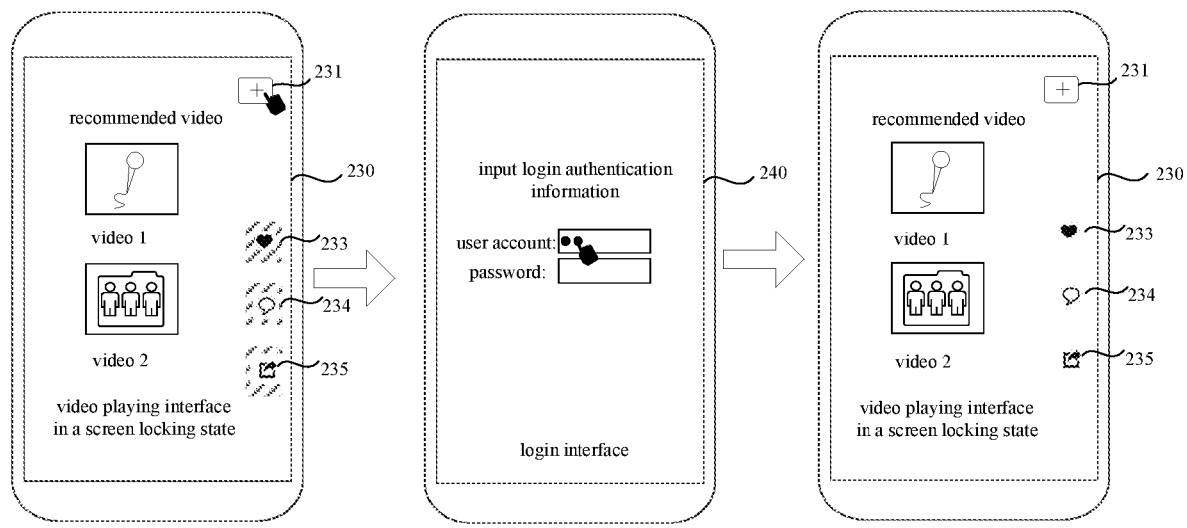

For example, in an account association example shown in FIG. 4B, a control related to user interaction in the disabled state, such as a like button 233, a comment button 234, a sharing button 235, and the like, which are surrounded by a shadow area, are displayed on a right side (which can further be another position such as a left side, a lower side, or the like, as long as the settings of other buttons in the screen locking interface are not affected) of the video playing interface 230 of the terminal device. The user can initiate an account association instruction by triggering (for example, clicking) any control (for example, the like button 233) related to user interaction shown in the figure. In response to the account association instruction, the terminal device can call and display a login interface 240 of a third-party video playing program; the user can input, into the login interface 240, a registered account of the third-party video playing program and a password or other login authentication information; and in response to an authentication success of the registered account and the password or other login authentication information that are input by the user, the terminal device can associate the registered account of the third-party video playing program with the unique video service registration identifier of the terminal device. According to some embodiments, as shown in FIG. 4B, in response to an authentication success of the registered account and the password or other login authentication information that are input by the user, the interface can be switched back to the previously displayed video playing interface 230, and can return, to the user, a corresponding response message indicating that the registered account are successfully associated with the unique video service registration identifier, through various prompts such as changing the control related to user interaction to an enabled state (for example, removing the surrounding shadow area). According to some embodiments, in response to an authentication success of the registered account and the password or other login authentication information that are input by the user, a response (for example, like feedback, or the like) related to an interaction function (for example, a like function) that can be implemented by the control related to user interaction, or an update (for example, update of like data, or the like) of interaction data of the interaction function that can be implemented by the control related to user interaction can further be made for the above triggering operation (for example, the above triggering operation for the like button 233) of the user. In this way, the account association and user interaction can be implemented based on one triggering action of the user, which can further improve the application experience of the user.

According to some embodiments, when a triggering operation of the user for the control related to user interaction in the disabled state has been received, the user can be prompted with "please associate a third-party video playing program first if the control related to user interaction needs to be used", and the user is requested to confirm (for example, by pressing a confirmation button) whether to associate the third-party video playing program. If the user confirms that the third-party video playing program is to be associated, the confirmation is regarded as sending, by the user, the account association instruction.

According to some embodiments, the account association instruction can further be implemented in response to a user triggering for the control related to user interaction and a response message that the registered account has not been associated with the unique video service registration identifier of the terminal device. In other words, in the account association example shown in FIG. 4B, when a triggering operation of the user for the like button 233 surrounded by the shadow area has been received, it can be first judged whether the registered account has been associated with the unique video service registration identifier of the terminal device, and in response to the registered account having not been associated with the unique video service registration identifier of the terminal device, it is determined that the account association instruction has been received, and the login interface 240 of the third-party video playing program is called and displayed. In this way, operation redundancy and resource consumption caused by repeated account association can be reduced, which improves the application experience of the user.

According to some embodiments, a shape of each button above is not limited as long as it can intuitively reflect a function to be implemented. For example, the account association button 231 can be set to an arbitrary shape that can intuitively reflect an account association function, such as a square with a plus sign in the middle as shown in FIG. 4A; and the like button 233 can be set to a heart shape, as shown in FIG. 4B, and so on. In addition, the login interface 240, called and displayed by the terminal device, of the third-party video playing program, can be a web-version login interface called by the terminal device through the video content server, or a login interface, called by the terminal device, of the installed third-party video playing program. In addition, the login interface 240 can be displayed on the video playing interface 230, and partially or wholly (as shown in FIG. 4A or FIG. 4B) covers the video playing interface 230, which is not limited thereto.

According to some embodiments, the display method of the video playing interface can further comprise: synchronizing user information related to the registered account with user information related to the unique video service registration identifier, the user information comprising at least one type of the following information: user's personal information (for example, nickname, sex, age and the like), user's playing history data (for example, which types, styles, regions, actors or themes of video contents have been played and their corresponding playing times, frequencies, or the like) for video contents, user's playing behavior information (for example, playing frequencies, playing time and the like) for video contents, user's preference information (for example, which types, styles, regions, actors and/or themes of video contents are preferences) for video contents, user's preference information (for example, user's preferences for advertisement information) for information recommendation contents, and video playing setting information (for example, volume, brightness, definition, language, subtitle and the like). In this way, the user information between the mutually associated accounts in the two different account systems corresponding to the third-party video playing program and the terminal device can be synchronously integrated, so that it is more convenient for the accurate push of video contents.

According to some implementations, the screen locking program can receive, from the video content server, user information corresponding to a registered account of the third-party video playing program associated with the unique video service registration identifier, and based on the user information corresponding to the registered account, generate or update user information corresponding to the unique video service registration identifier. Thus, the unique video service registration identifier can have the consistent user information with the registered account of the associated third-party video playing program. For example, if a user plays a certain video content through a third-party video playing program to generate or update playing history information corresponding to a registered account of the third-party video playing program, a video playing program contained in a screen locking program also generates or updates the playing history information corresponding to an associated unique video service registration identifier. On the other hand, user information generated by playing, by the user, a video content by using the video playing program contained in the screen locking program can also be sent to the video content server, so that the video content server updates, based on the user information, user information corresponding to the registered account of the associated third-party video playing program. For example, if a user plays a certain video content through a video playing program contained in a screen locking program to generate or update playing history information corresponding to the unique video service registration identifier, a third-party video playing program also synchronously generates or updates the playing history information corresponding to an associated registered account.

According to some embodiments, the video list displayed or video data played in the video playing interface and video list displayed or video data played by the third-party video playing program when the user logs in the third-party video playing program based on the registered account are pushed based on same user information (for example, user's personal information, user's playing history data for video contents, user's playing behavior information for video contents, and/or user's preference information for video contents, etc.). Therefore, video contents of roughly a same type can be pushed to one arbitrary account used by the user in the two different account systems corresponding to the third-party video playing program and the terminal device, so that it can be more convenient for the user to browse his own interested content, which improves the application experience of the user.

As described above, the video list displayed or the video data played in the video playing interface can be pushed based on the general non-personalized parameter, and the user information corresponding to the unique video service registration identifier and/or the user information corresponding to the registered account. According to some embodiments, a weight of user information (for example, the user information corresponding to the unique video service registration identifier and/or the user information corresponding to the registered account) on which the push strategy is based in the push strategy after the above association is performed can be greater than a weight of user information (for example, the user information corresponding to the unique video service registration identifier) on which the push strategy is based in the push strategy before the association is performed. For example, before the association is performed, a weight of user information (for example, the user information corresponding to the unique video service registration identifier) on which the push strategy is based in the push strategy can be less than or equal to a weight of the general non-personalized parameter in the push strategy, and after the association is performed, a weight of user information (for example, the user information corresponding to the unique video service registration identifier and/or the user information corresponding to the registered account) on which the push strategy is based in the push strategy can be greater than the weight of the general non-personalized parameter in the push strategy. In this way, after the account association, when the push of video contents are performed, a proportion of the user information can be made greater, which is more convenient to realize the accurate and personalized push of the video contents. In addition, the weight of the user information (for example, the user information corresponding to the unique video service registration identifier and/or the user information corresponding to the registered account) in the push strategy can also be gradually increased with an increase of the amount of data of corresponding user information. In addition, as an alternative, after the association is performed, the video list displayed or the video data played in the video playing interface can further be pushed based on the user information corresponding to the unique video service registration identifier and/or the user information corresponding to the registered account, that is, the general non-personalized parameter may not be considered.

According to some embodiments, the display method of the video playing interface can further comprise: synchronizing user interaction data related to the registered account with user interaction data related to the unique video service registration identifier. Therefore, data related to user interaction, such as liking, commenting, sharing, following, and the like, which are performed by the user by using the two different account systems corresponding to the third-party video playing program and the terminal device, can be synchronously integrated and/or displayed.

According to some implementations, the screen locking program can receive, from the video content server, user interaction data corresponding to the registered account of the third-party video playing program associated with the unique video service registration identifier, and based on the user interaction data corresponding to the registered account, generate or update user interaction data corresponding to the unique video service registration identifier. Thus, the unique video service registration identifier can have the consistent user interaction data with the registered account of the associated third-party video playing program. For example, if a user likes or leaves a comment on a certain video content through a third-party video playing program by using a registered account, it can also be displayed that the user has ever liked or left the comment on the video content when the video content is played by a video playing program contained in a screen locking program. On the other hand, user interaction data generated when the user uses the video playing program contained in the screen locking program based on the unique video service registration identifier can also be sent to the video content server, so that the video content server can update user interaction data corresponding to the registered account of the associated third-party video playing program based on the user interaction data. For example, if a user likes or leaves a comment on a certain video content through a video playing program contained in a screen locking program based on the unique video service registration identifier, the video content in a third-party video playing program is displayed as having been subjected to liking or leaving the comment of a registered account of the associated third-party video playing program.

According to some embodiments, the screen locking program further comprises a video decoding program matched with the video playing program contained in the screen locking program, and the display method of the video playing interface can further comprise: decoding to-be-played video data through the video decoding program contained in the screen locking program. In other words, the decoding of the video data can be performed through the video decoding program matched with the video playing program contained in the screen locking program, so that the decoding effect of the video data is better, which improves the video viewing experience of the user. In addition, since the screen locking program is the system program of the terminal device and has a extremely high application-calling authority, the to-be-played video data can also be decoded by a general system video decoding program built in the terminal device.

Through one or more of the above embodiments, even if the third-party video playing program is not installed or has been uninstalled in the terminal, an experience similar to using the third-party video playing program can also be obtained through the video playing program in the screen locking program.

According to some embodiments, the video playing program can also be the third-party video playing program called by the screen locking program of the terminal device and installed in the terminal device. In other words, the terminal device can further implement video playing in the screen locking state by using the existing video playing program resource, or can run the installed third-party video playing software in a case of not unlocking the terminal device. In this case, it can be convenient for the user to perform more operations, and the waste of the existing video playing program resource can be avoided.

According to some embodiments, in response to the video playing instruction, the switching from the screen locking interface to the video playing interface displayed according to the video playing program in the screen locking state comprises: in response to the video playing instruction, displaying, over the screen locking interface of the terminal device, the video playing interface displayed according to the third-party video playing program, and covering the screen locking interface.

According to some embodiments, the video playing interface displayed according to the third-party video playing program in the screen locking state can be displayed on the screen locking interface of the terminal device and completely covers the screen locking interface. In other words, the video playing interface displayed according to the third-party video playing program in the screen locking state does not belong to the screen locking interface generated by the screen locking program, but is an application interface different from the screen locking interface and generated by another third-party application program, and is located at a level different from the screen locking interface.

According to some embodiments, the video playing interface displayed according to the third-party video playing program in the screen locking state can be substantially consistent with a video playing interface displayed by the third-party video playing program when the terminal device is unlocked and the third-party video playing program installed in the terminal device is started. Of course, the video playing interface can also, as shown in FIG. 2, have therein displayed the video list, and videos in the list can be presented to the user in a form of thumbnails; and the user can select a corresponding video to play by browsing up and down and clicking an interested video content. In addition, after the user selects the corresponding video to click and play, various common video playing control buttons, for example, back, pause, etc., control buttons, can further be displayed in a displayed video playing sub-interface.

According to some embodiments, the video list or the video data in the video playing interface displayed according to the third-party video playing program can be acquired from the video content server by the third-party video playing program based on the registered account of the user for the third-party video playing program or a random non-registered identifier. In other words, the video list or the video data in the video playing interface displayed according to the third-party video playing program can be acquired indirectly from the video content server by the screen locking program via the third-party video playing program. Thus, as shown in FIG. 3, different from the scene where the video playing program can be a sub-program contained in the screen locking program of the terminal device, for a scene where the video playing program can be the third party video playing program called by the screen locking program of the terminal device and installed in the terminal device, the screen locking program 311 can acquire a corresponding video list or video data from the video content server 320 through a path 2 (a path shown by a dotted line in FIG. 3) instead of the path 1, that is, via the third party video playing program 330 installed in the terminal device 310.

According to some embodiments, the third-party video playing program can be a video playing program preset to have an authority of allowing it to be called by the screen locking program for display on the screen locking interface. For example, a third-party video playing program installed in the terminal device can initiate an authority setting request to the terminal device according to a user triggering; and in response to the authority setting request, the terminal device can set an authority of the third-party video playing program to allow it to be called by the screen locking program for display on the screen locking interface. As an alternative, the user can, by directly changing setting information of the third-party video playing program installed in the terminal device, set the third-party video playing program to a video playing program having an authority of allowing it to be called by the screen locking program for display on the screen locking interface.

According to some embodiments, for the scene where the video playing program can be the third-party video playing program called by the screen locking program of the terminal device and installed in the terminal device, the to-be-played video data can further be decoded by a video decoding program matched with the third-party video playing program. The video decoding program matched with the third-party video playing program can also be installed in the terminal device, but it is equivalent to a third-party application program, and thus is different from the video decoding program contained in the screen locking program (which is the system program) described in the foregoing embodiment of the present disclosure.

According to some embodiments, in the present disclosure, in response to the video playing instruction, the terminal device can first determine that it is necessary to switch from the screen locking interface to the video playing interface displayed according to the video playing program contained in the screen locking program in the screen locking state or the video playing interface displayed according to the installed third-party video playing program, and perform a corresponding switching operation according to the determination result.

According to some embodiments, the determining can comprise: if it is determined that the third-party video playing program is installed in the terminal device, it can be determined that it can be switched from the screen locking interface to the video playing interface displayed according to the installed third-party video playing program in the screen locking state. On the other hand, if it is determined that the third-party video playing program is not installed in the terminal device, it can be determined to switch from the screen locking interface to the video playing interface displayed according to the video playing program contained in the screen locking program in the screen locking state. As an alternative, priorities can be set for the video playing program contained in the screen locking program and the installed third-party video playing program in the terminal device, and according to the priorities, selection can be to switch to a video playing interface displayed according to a video playing program with a relatively high priority in the screen locking state. For example, it can be set that the video playing interface is displayed through the video playing program contained in the screen locking program regardless of whether the third-party video playing program is installed in the terminal device. As an alternative, according to a previous interface switching situation of the terminal device, selection can further be to switch to a video playing interface displayed according to a video playing program that is the same as or different from a video playing program corresponding to a previous video playing interface in the screen locking state. In this way, according to an actual situation and/or specific application scene of the terminal device, adaptive selection can be to switch to a video playing interface displayed according to an appropriate video playing program, which improves the application experience of the user.

According to some embodiments, the video list displayed or the video data played in the video playing interface in the screen locking state through the video playing program can be a video list or video data not containing data related to a user interaction behavior (i.e., not containing user interaction data). Therefore, the effect that the presented video list or video data will not expose the privacy related to preferences of the user as long as the user does not unlock the terminal device can be realized, so as to realize the purpose of protecting the privacy and security of the user. From an interface perspective, the displayed video list or played video data not containing the data related to the user interaction behavior can be represented as: as shown in FIG. 2, controls related to user interaction, such as liking, commenting, sharing, following, etc., may not be disposed in the switched-to video playing interface 230, or as shown in FIG. 4B, controls related to user interaction, such as liking, commenting, sharing, following, etc., which are displayed in the switched-to video playing interface 230, can be in a disabled state.

Accordingly, according to some embodiments, in order to implement user interaction to facilitate the user to perform more operations and improve the video playing experience of the user, the method can further comprise: receiving an authentication request for user interaction initiated by the user for the video playing interface; and in response to an authentication success, enabling the control related to user interaction in the video playing interface.

According to some implementations, in response to the authentication success, the enabling the control related to user interaction in the video playing interface can comprise: in response to the authentication request for user interaction, displaying an authentication interface for user interaction; receiving authentication information input by the user into the authentication interface for user interaction; and in response to an authentication success of the authentication information, enabling the control related to user interaction in the video playing interface. According to some implementations, before the authentication success, the control related to user interaction may not be displayed in the video playing interface. In this case, the enabling the control related to user interaction can comprise displaying the control related to user interaction. According to other implementations, before the authentication success, the control related to user interaction may have been displayed in the video playing interface but the control is in a disabled state. In this case, the enabling the control related to user interaction can comprise causing the control related to user interaction to change to an enabled state. In other words, the enabling the control related to user interaction in the video playing interface can comprise: displaying, in the video playing interface, the control related to user interaction not originally displayed; or, changing the control related to user interaction from the disabled state to the enabled state.

Figure 5:
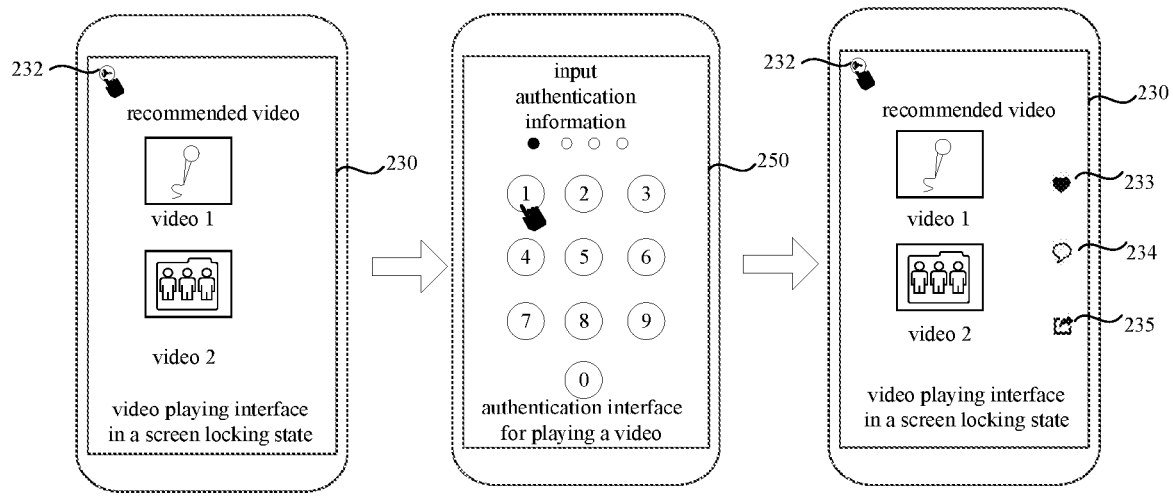
FIG. 5 is a schematic diagram illustrating performing user authentication to enable a control related to user interaction in a video playing interface, according to an exemplary embodiment of the present disclosure.

According to some embodiments, an authentication button for user interaction can be disposed in the video playing interface, and the authentication request for user interaction can be initiated based on the authentication button for user interaction. For example, FIG. 5 is a schematic diagram illustrating performing user authentication to display a control related to user interaction in a video playing interface according to an exemplary embodiment of the present disclosure. An authentication button 232 for user interaction can be displayed, for example, at an upper left corner (which can further be another position such as a lower left corner, an upper right corner, a lower right corner, or the like, as long as the settings of other buttons in the screen locking interface are not affected) of the video playing interface 230 of the terminal device. The user can initiate the authentication request for user interaction by triggering (clicking) the authentication button 232 for user interaction. In response to the authentication request for user interaction, the terminal device will display an authentication interface 250 for user interaction; the user can input, into the authentication interface 250 for user interaction, authentication information, which can be, but is not limited to, a fingerprint password, a digital password, or a gesture password, etc.; and in response to an authentication success of the authentication information input by the user, the terminal device can display, in the video playing interface 230, the control related to user interaction, such as a like button 233, a comment button 234, a sharing button 235, and the like, as shown in FIG. 5. A shape of each button is not limited as long as its function to be realized can be intuitively reflected. For example, the authentication button 232 for user interaction can be a circle disposed with a key shape in the middle, the like button 233 can be a heart shape, and the like. In addition, the above successfully authenticated authentication information for the authentication interface 250 for user interaction, such as a fingerprint password, digital password, or gesture password, can be the same as or different from the unlocking information required to unlock the terminal device, which is not limited.

As an alternative, a control related to user interaction can be displayed in the video playing interface, the control related to user interaction is in a disabled state, and the authentication request for user interaction can further be implemented through a user triggering for the control related to user interaction (for example, a like button, and the like) in the disabled state. According to some implementations, the control related to user interaction in the disabled state can be displayed in a special style such as gray or being surrounded or covered by a shadow area, so as to be distinguished from a common style of a control related to user interaction in an enabled state. Of course, the control related to user interaction in the disabled state can also be displayed in the common style. According to some embodiments, in response to an authentication success of the authentication information input by the user into the authentication interface for user interaction, the control related to user interaction can be changed from the disabled state to the enabled state. In addition, in response to the authentication success of the authentication information input by the user into the authentication interface for user interaction, a response (for example, a like feedback, an update of like data, or the like) related to an interaction function (for example, a like function) that can be implemented by the control related to user interaction can further be made for the user triggering (for example, a user triggering for a like button). In this way, based on one triggering action of the user, the enabling the control related to user interaction can be realized, and the user interaction can be realized, which can further improve the application experience of the user.

As described above, the authentication request for user interaction and the account association instruction involved when the registered account of the user for the third-party video playing program is associated with the unique video service registration identifier of the terminal device can be implemented based on a same user triggering, for example, they can be based on a same user triggering for a control related to user interaction in a disabled state. In response to the same user triggering, the account association operation and the operation of enabling the control related to user interaction can be implemented together, wherein the "being implemented together" herein can include being implemented simultaneously and being implemented in sequence. As an alternative, when a triggering operation of the user for a control related to user interaction in a disabled state is received, the user can be prompted to select "enabling the control related to user interaction" or "associating with the third-party video playing program" or "enabling the control related to user interaction and associating with the third-party video playing program", and a subsequent corresponding operation is performed according to a selection result of the user, so as to enhance flexibility of the user operation.

According to some embodiments, the display method of the video playing interface of the present disclosure can further comprise: receiving an interface exit instruction of the user for the video playing interface in the screen locking state; and in response to the interface exit instruction, switching from the video playing interface back to the screen locking interface.

Although not shown in the drawings, an interface exit button can further be disposed in the video playing interface; and the interface exit instruction can be initiated based on the interface exit button. Similar to other buttons, a shape and a position of the interface exit button are not limited as long as its function to be realized can be intuitively reflected and the settings of other buttons in the video playing interface are not affected.

Figure 6:
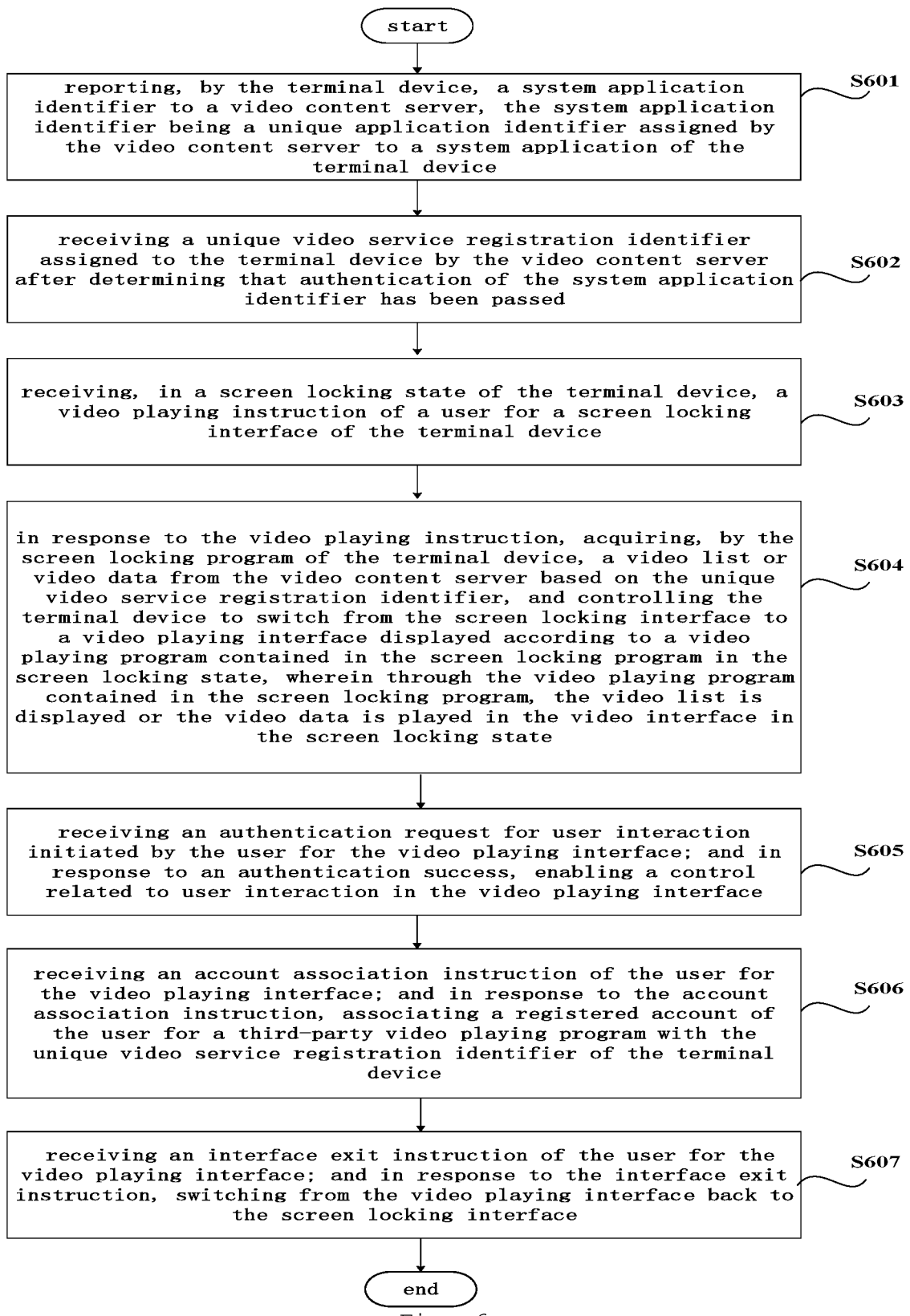
FIG. 6 is an overall flowchart illustrating a display method of a video playing interface, in a scene where a video playing program can be a sub-program contained in a screen locking program of a terminal device, according to an exemplary embodiment of the present disclosure.

The display method of the video playing interface of the present disclosure has been exemplarily described above with reference to FIGS. 1 to 5. The display method of the video playing interface of the present disclosure will be further described in detail with reference to FIG. 6, where FIG. 6 illustrates an overall flowchart of a display method of a video playing interface in a scene where a video playing program can be a sub-program contained in a screen locking program of a terminal device according to an exemplary embodiment of the present disclosure. It should be noted that the various definitions, embodiments, implementations, examples, etc. described above with reference to FIGS. 1 to 5 can also be applied to or combined with exemplary embodiments described thereafter.

According to some embodiments, as shown in FIG. 6, for a scene where a video playing program can be a sub-program contained in a screen locking program of a terminal device, the display method of the video playing interface of the present disclosure can comprise the following steps.

Step S601, reporting, by the terminal device, a system application identifier to a video content server, the system application identifier being a unique application identifier assigned by the video content server to a system application of the terminal device.

According to some embodiments, the assignment of the system application identifier can occur before the terminal device leaves a factory, and after the assigned system application identifier has been acquired, a system application developer of the terminal device can implant the system application identifier into the corresponding terminal device, so that the terminal device can carry the corresponding system application identifier when leaving the factory, wherein system application identifiers corresponding to terminal devices having a same system application are generally the same. Of course, according to actual needs, the terminal device can also instruct the corresponding system application developer to or directly apply for the system application identifier to the video content server after receiving a video playing instruction of a user for a screen locking interface of the terminal device for the first time or in other time periods, and performs security authentication with the video content server based on the applied system application identifier.

Step S602, receiving a unique video service registration identifier assigned to the terminal device by the video content server after determining that authentication of the system application identifier has been passed.

According to some embodiments, after determining that the system application identifier authentication has been passed, that is, determining that the system application of the terminal device is safe and legal, the video content server can request the terminal device to report the unique device identifier of the terminal device, such as fingerprint information and/or physical address information of the terminal device, and assigns the unique video service registration identifier to the terminal device based on the unique device identifier reported by the terminal device.

According to some embodiments, after the terminal device has received the unique video service registration identifier, it can be stored locally in the terminal device, so that a corresponding video list or video data can be subsequently acquired from the video content server based on the unique video service registration identifier.

It should be noted that, in the present disclosure, the steps S601 and S602 are initialization steps of connecting the terminal device with the video content server to acquire the unique video service registration identifier (or perform security authentication), and the initialization steps are optional steps, rather than essential steps, of the display method of the video playing interface. For example, if the terminal device has acquired the unique video service registration identifier from the video content server based on the corresponding system application identifier, the above steps S601 and S602 do not need to be performed again. In addition, as mentioned above, according to actual needs, the above steps S601 and S602 can also occur after the terminal device has received the video playing instruction of the user for the screen locking interface of the terminal device for the first time or in other time periods. According to some implementations, the steps S601 and S602 can be steps performed by a device manufacturer before the terminal device leaves the factory for sale.

Step S603, receiving, in a screen locking state of the terminal device, a video playing instruction of a user for a screen locking interface of the terminal device.

Referring to the related description of the foregoing embodiments of the present disclosure, the video playing instruction can be implemented by a user input for the screen locking interface, or the video playing instruction can further be implemented in response to the user input for the screen locking interface and a user authentication success. The user input can include, for example: a screen swipe operation, button input, voice input, face image input (i.e., a facial image input), or any combination thereof. The user authentication success can include, for example: a biometric identification authentication success, password authentication success, question-and-answer authentication success, or any combination thereof. The biometric identification authentication success can include, for example, at least one of: a facial identification authentication success, fingerprint identification authentication success, and iris identification authentication success.

Step S604, in response to the video playing instruction, acquiring, by the screen locking program of the terminal device, a video list or video data from the video content server based on the unique video service registration identifier, and controlling the terminal device to switch from the screen locking interface to a video playing interface displayed according to a video playing program contained in the screen locking program in the screen locking state, wherein through the video playing program contained in the screen locking program, the video list is displayed or the video data is played in the video playing interface in the screen locking state.

According to some embodiments, as shown in the path 1 in FIG. 3, the video list or the video data can, based on the unique video service registration identifier, be directly acquired from the video content server by the screen locking program through direct communication with the video content server.

According to some embodiments, as shown in FIG. 2, videos in the video list can be presented to the user in a form of thumbnails; and the user can select a corresponding video to play by browsing up and down and clicking an interested video content. In addition, after the user selects the corresponding video to play, various common video playing control buttons, for example, back, pause, etc, control buttons can be displayed in a displayed video playing sub-interface.

According to some embodiments, as shown in FIG. 2, the video playing interface can cover the entire display screen of the terminal device; and of course, it can also cover only part of the display screen of the terminal device. In addition, since the video playing program contained in the screen locking program is a sub-program of the screen locking program (which is a system program of the terminal device), the video playing interface in the screen locking state can be equivalent to a sub-interface of the screen locking interface of the terminal device, for example, can be equivalent to a screen locking sub-interface different from a screen locking main interface.

According to some embodiments, the screen locking program further comprises a video decoding program matched with the video playing program contained in the screen locking program, and the display method of the video playing interface can further comprise: decoding to-be-played video data through the video decoding program contained in the screen locking program. That is, the decoding of the video data can be performed through the video decoding program which is in the screen locking program and matched with the video playing program contained in the screen locking program, so that the decoding effect of the video data is better, which improves the video viewing experience of the user. In addition, since the screen locking program is a system program of the terminal device and has an extremely high application-calling authority, the to-be-played video data can also be decoded by a general system video decoding program built in the terminal device, which is not limited.

According to some embodiments, switching from the screen locking interface to the video playing interface displayed according to the video playing program contained in the screen locking program in the screen locking state does not need to involve switching between processes, but can be implemented by additionally starting a thread in a process of the screen locking program, which is not limited.

According to some embodiments, in order to implement the user interaction and the association and integration of user data so as to facilitate the user to perform more operations and improve the video playing experience of the user, after the step S604, the display method of the video playing interface can further comprise the following steps, S605 and S606, wherein FIG. 6 exemplarily illustrates that step S605 precedes step S606, but it should be noted that the execution order of the two steps is not limited thereto, and can also be executed in parallel or in order of step S606 preceding step S605.

Step S605: receiving an authentication request for user interaction initiated by the user for the video playing interface; and in response to an authentication success, enabling a control related to user interaction in the video playing interface.

According to some embodiments, the enabling the control related to user interaction in the video playing interface can comprise: displaying, in the video playing interface, the control related to user interaction not originally displayed; or, changing the control related to user interaction from a disabled state to an enabled state.

According to some embodiments, taking an example that the control related to user interaction is not displayed in the video playing interface before the authentication request for user interaction is received, a process of a user interaction authentication can be shown in FIG. 5. After the user interaction authentication, the control related to user interaction, such as a like button 233, a comment button 234, a sharing button 235, and the like, can be displayed in the video playing interface in the screen locking state. Therefore, the user can, based on these buttons, view user interaction data of a corresponding video content and/or perform an interaction behavior such as liking, commenting and sharing for the corresponding video content, which improves the video application experience of the user.

Step S606: receiving an account association instruction of the user for the video playing interface; and in response to the account association instruction, associating a registered account of the user for a third-party video playing program with the unique video service registration identifier of the terminal device.

According to some embodiments, the process of the account association can be shown in FIG. 4A or FIG. 4B. In other words, the account association instruction can be initiated based on an account association button disposed in the video playing interface; or can further be initiated based on a control related to user interaction displayed in the video playing interface, wherein the control related to user interaction can be in a disabled state. In addition, after the account association, user information related to the registered account and user information related to the unique video service registration identifier can be synchronized, and/or user interaction data related to the registered account and user interaction data related to the unique video service registration identifier can be synchronized, and the like. The user information includes at least one type of the following information: user's personal information, user's playing history data for video contents, user's playing behavior information for video contents, user's preference information for video contents, user's preference information for information recommendation contents, and video playing setting information.

According to some embodiments, after the account association, the video list displayed or the video data played in the video playing interface and video list displayed or the video data played by the third-party video playing program when the user logs in the third-party video playing program based on the registered account are pushed based on same user information. Therefore, the user can obtain roughly a same type of video contents by using one arbitrary account in two different account systems corresponding to the third-party video playing program and the terminal device, so that it can be more convenient for the user to browse his interested content, which improves the application experience of the user.

According to some embodiments, after the account association, the video list displayed or the video data played in the video playing interface can be pushed based on a general non-personalized parameter, and the user information corresponding to the unique video service registration identifier and/or the user information corresponding to the registered account. According to some embodiments, a weight of the user information (for example, the user information corresponding to the unique video service registration identifier and/or the user information corresponding to the registered account) on which a push strategy is based in the push strategy after the above association is performed can be greater than a weight of the user information (for example, the user information corresponding to the unique video service registration identifier) on which the push strategy is based in the push strategy before the association is performed. For example, before the association is performed, the weight of the user information (for example, the user information corresponding to the unique video service registration identifier) on which the push strategy is based in the push strategy can be less than or equal to a weight of the general non-personalized parameter in the push strategy, and after the association is performed, the weight of the user information (for example, the user information corresponding to the unique video service registration identifier and/or the user information corresponding to the registered account) on which the push strategy is based in the push strategy can be greater than the weight of the general non-personalized parameter in the push strategy. In this way, after the account association, when the push of video contents is performed, a proportion of the user information can be made greater, which is more convenient to realize the accuracy and personalized push of the video contents. In addition, the weight of the user information (for example, the user information corresponding to the unique video service registration identifier and/or the user information corresponding to the registered account) in the push strategy can also gradually be increased with an increase of the amount of data of the corresponding user information.

According to some embodiments, as shown in FIG. 6, the display method of the video playing interface of the present disclosure can further comprise: step S607: receiving an interface exit instruction of the user for the video playing interface; and in response to the interface exit instruction, switching from the video playing interface back to the screen locking interface.

Although not shown in the drawings, an interface exit button can further be disposed in the video playing interface; and the interface exit instruction can be initiated based on the interface exit button. Similar to other buttons, a shape and position of the interface exit button are not limited as long as its function to be realized can be intuitively reflected and the settings of other buttons in the video playing interface are not affected.

The exemplary method of display of the video playing interface according to the present disclosure have been described above in conjunction with the accompanying drawings. An exemplary apparatus of display of a video playing interface of the present disclosure and an exemplary embodiment of a terminal device will be further described below in conjunction with the accompanying drawings.

Figure 7:
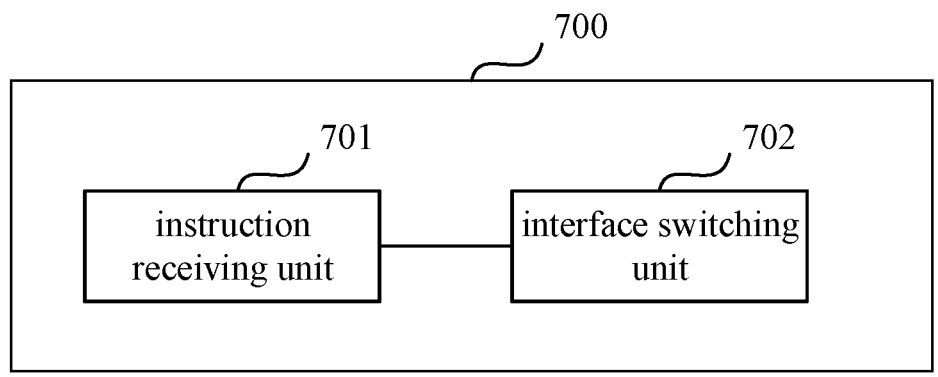
FIG. 7 is a structural block diagram illustrating a video playing apparatus according to an exemplary embodiment of the present disclosure.

One aspect of the present disclosure can include an apparatus for display of a video playing interface. FIG. 7 is a structural block diagram illustrating an apparatus for display of a video playing interface according to an exemplary embodiment of the present disclosure. As shown in FIG. 7, the apparatus 700 for display of the video playing interface can comprise: an instruction receiving unit 701 configured to receive, in a screen locking state of a terminal device, a video playing instruction of a user for a screen locking interface of the terminal device; and an interface switching unit 702 configured to switch, in response to the video playing instruction, from the screen locking interface to a video playing interface displayed according to a video playing program in the screen locking state, wherein through the video playing program, a video list is displayed or video data is played in the video playing interface in the screen locking state.

According to some embodiments, the apparatus 700 for display of the video playing interface can further comprise units configured to perform other steps of any of the methods described above, for example, an information synchronization unit configured to synchronize video browsing or playing information of a video content displayed in the video playing program with video browsing or playing information of the video content stored in a video content server; an account association unit configured to receive an account association instruction of the user for the video playing interface, and in response to the account association instruction, associate a registered account of the user for a third-party video playing program with a unique video service registration identifier of the terminal device; and an authentication unit configured to receive an authentication request initiated by the user for the video playing interface, and enable a control related to user interaction in the video playing interface in response to an authentication success, and so on.

In the above, the exemplary apparatus for display of the video playing interface of the present disclosure has been briefly described. It should be noted that specific implementations of units or features of the exemplary apparatus for display of the video playing interface of the present disclosure can refer to specific implementations of corresponding features in the foregoing exemplary display method of the video playing interface of the present disclosure, and thus they are not repeated. In addition, the units involved in describing the exemplary apparatus of the present disclosure can be implemented by software, and can also be implemented by hardware. A name of the unit does not, in some cases, constitute a limitation on the unit itself.

In addition, functions of various units of the exemplary apparatus of the present disclosure can be performed, at least in part, by one or more hardware logic components. For example, without limitation, exemplary types of hardware logic components that can be used include: field programmable gate array (FPGA), application specific integrated circuit (ASIC), application specific standard product (ASSP), system on a chip (SOC), complex programmable logic device (CPLD), and the like.

One aspect of the present disclosure can include a terminal device, which can comprise a processor; and a memory having therein stored a program, the program comprising instructions which, when executed by the processor, cause the processor to perform any of the methods described above.

One aspect of the present disclosure can include a computer-readable storage medium having therein stored a program, the program comprising instructions which, when executed by a processor of an electronic device, cause the electronic device to perform any of the methods described above.

One aspect of the present disclosure can include a computer program product comprising a program, the program comprising code which, when executed by a processor of an electronic device, causes the electronic device to perform any of the methods described above.

Figure 8:
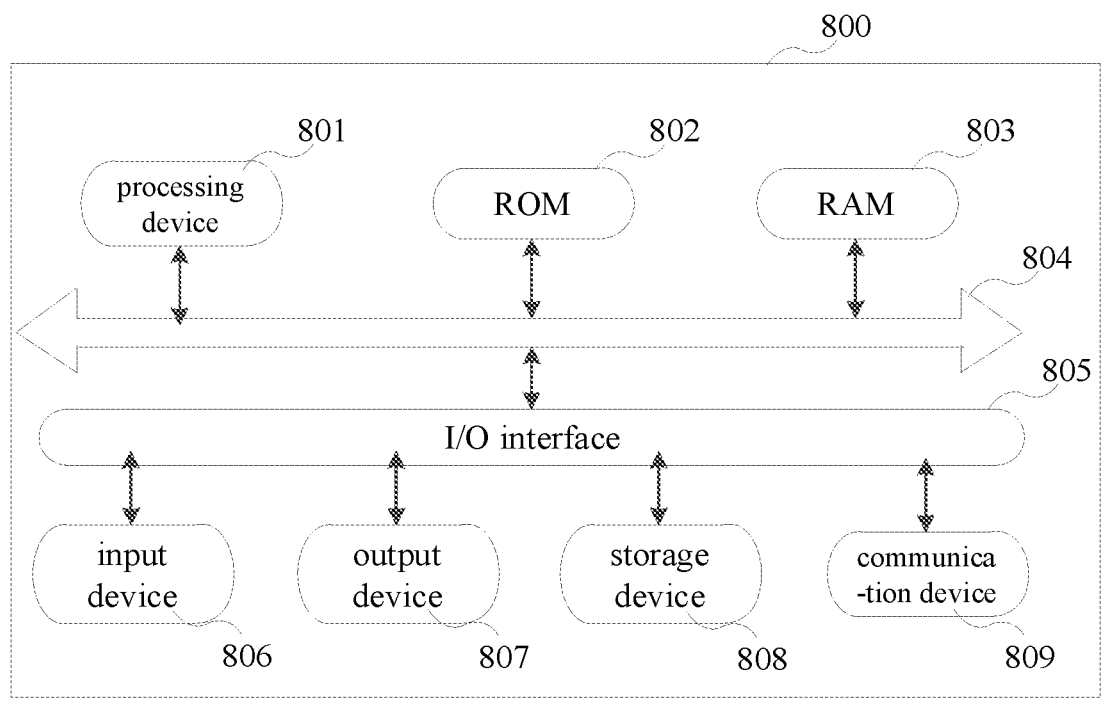
FIG. 8 is a structural block diagram illustrating an exemplary electronic device applicable to an exemplary embodiment of the present disclosure.

Reference will be made below to FIG. 8, which shows a structural schematic diagram of an electronic device 800 (for example, a terminal device in the present disclosure) suitable for implementing an embodiment of the present disclosure. The electronic device shown in FIG. 8 is only an example, and should not bring any limitation to a function and use scope of the embodiment of the present disclosure.

As shown in FIG. 8, the electronic device 800 can comprise a processing device (for example, a central processing unit, a graphics processor, etc.) 801 that can perform various appropriate actions and processes according to a program stored in a read only memory (ROM) 802 or a program loaded from a storage device 808 into a random access memory (RAM) 803. In the RAM 803, various programs and data required for an operation of the electronic device 800 are also stored. The processing device 801, the ROM 802, and the RAM 803 are connected to each other through a bus 804. An input/output (I/O) interface 805 is also connected to the bus 804.

Generally, the following devices can be connected to the I/O interface 805: an input device 806 including, for example, a touch screen, touch pad, keyboard, mouse, camera, microphone, accelerometer, gyroscope, or the like; an output device 807 including, for example, a liquid crystal display (LCD), speaker, vibrator, or the like; a storage device 808 including, for example, a magnetic tape, hard disk, or the like; and a communication device 809. The communication device 809 can allow the electronic device 800 to be in wireless or wire communication with other devices to interchange data. Although FIG. 8 illustrates the electronic device 800 having various devices, it should be understood that not all illustrated device are required to be implemented or provided. More or less devices can be alternatively implemented or provided.

Particularly, according to an embodiment of the present disclosure, a process described above with reference to a flowchart can be implemented as a computer software program. For example, an embodiment of the present disclosure includes a computer program product comprising a computer program carried on a non-transitory computer-readable medium, the computer program containing program code for performing a method illustrated by the flowchart. In such an embodiment, the computer program can be downloaded and installed from a network via the communication device 809, or installed from the storage device 808, or installed from the ROM 802. The computer program, when executed by the processing device 801, executes the above functions defined in the method of the embodiment of the present disclosure.

It should be noted that the above computer-readable medium of the present disclosure can be a computer-readable signal medium or a computer-readable storage medium or any combination of the above two. The computer-readable storage medium can be, for example, but is not limited to, an electronic, magnetic, optical, electromagnetic, infrared, or semiconductor system, apparatus, or device, or any combination of the foregoing. More specific examples of the computer-readable storage medium can include, but are not limited to: an electric connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium can be any tangible medium having therein contained or stored a program that can be used by or in conjunction with an instruction execution system, apparatus, or device. However, in the present disclosure, the computer-readable signal medium can include a data signal propagated in baseband or as part of a carrier wave, in which computer-readable program code is carried. Such a propagated data signal can take a variety of forms that include, but are not limited to, an electro-magnetic signal, an optical signal, or any suitable combination of the foregoing. The computer-readable signal medium can also be any computer-readable medium other than the computer-readable storage medium, and the computer-readable signal medium can send, propagate, or transmit a program for use by or in conjunction with an instruction execution system, apparatus, or device. Program code embodied in the computer-readable medium can be transmitted using any appropriate medium that includes, but is not limited to: an electrical wire, optical cable, RF (radio frequency), etc., or any suitable combination of the foregoing.

In some implementations, examples of the communication network include a local area network ("LAN"), a wide area network ("WAN"), an internet (for example, the Internet), and a peer-to-peer network (for example, an ad hoc peer-to-peer network), as well as any currently known or future developed network.

The above computer-readable medium can be embodied in the electronic device; or it can be alone without being assembled into the electronic device.

The above computer-readable medium has therein carried one or more programs which, when executed by the electronic device, cause the electronic device to: receive, in a screen locking state of the electronic device, a video playing instruction of a user for a screen locking interface of the electronic device; and switching, in response to the video playing instruction, from the screen locking interface to a video playing interface displayed according to a video playing program in the screen locking state, wherein through the video playing program, a video list is displayed or video data is played in the video playing interface in the screen locking state.

Computer program code for performing an operation of the present disclosure can be written in one or more programming languages or a combination thereof, and the programming language includes, but is not limited to, an object-oriented programming language such as Java, Smalltalk, C++, and also includes a conventional procedural programming language, such as a "C" programming language or a similar programming language. The program code can be executed entirely on a user's computer, partly on the user's computer, as a stand-alone software package, partly on the user's computer and partly on a remote computer or entirely on the remote computer or server. In a scene where the remote computer is involved, the remote computer can be connected to the user's computer through an arbitrary type of network that includes a local area network (LAN) or a wide area network (WAN), or it can be connected to an external computer (for example, through the Internet using an Internet service provider).

Flowcharts and block diagrams in the accompanying drawings illustrate an architecture, functions, and operations of possible implementations of systems, methods and computer program products according to various embodiments of the present disclosure. In this regard, each block in the flowcharts or block diagrams can represent a module, a program segment, or portion of code, which comprises one or more executable instructions for implementing specified logical functions. It should also be noted that, in some alternative implementations, functions noted in blocks can also occur in an order different from an order noted in the drawings. For example, two blocks shown in succession can, in fact, be executed substantially in parallel, and they can also sometimes be executed in a reverse order, which depends upon functions involved. It will also be noted that each block in the block diagrams and/or flowcharts, and a combination of blocks in the block diagrams and/or flowcharts, can be implemented by using a special-purpose hardware-based system that performs specified functions or operations, or by using a combination of special-purpose hardware and computer instructions.

In the context of this disclosure, a machine-readable medium can be a tangible medium that can have therein contained or stored a program for use by or in conjunction with an instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination of the foregoing. More specific examples of the machine-readable storage medium would include an electric connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The above description is only preferred embodiments of the present disclosure and explanations for applied technical principles. It should be appreciated by those skilled in the art that the disclosure scope involved in the present disclosure is not limited to technical solutions formed by a specific combination of the above technical features, but also encompasses, without departing from the above disclosure concept, other technical solutions formed by an arbitrary combination of the above technical features or their equivalent features. For example, a technical solution is formed by interchanging the above features with technical features having functions similar to functions disclosed (but not limited to) in the present disclosure.

Furthermore, although operations are depicted in a specific order, this should not be understood as requiring that these operations be performed in the specific order shown or in a sequential order. Under certain circumstances, multitasking and parallel processing may be advantageous. Similarly, although several specific implementation details are included in the above discussion, these should not be construed as limitations on the scope of the present disclosure. Certain features that are described in the context of individual embodiments can also be implemented in combination in a single embodiment. Conversely, various features that are described in the context of a single embodiment can further be implemented in a plurality of embodiments individually or in any suitable sub-combination.

Although the subject matter has been described in language specific to structural features and/or method logical actions, it should be understood that the subject matter defined in the attached claims is not necessarily limited to the specific features or actions described above. On the contrary, the specific features and actions described above are only example forms of implementing the claims.

What is claimed is:

1. A display method of a video playing interface, comprising:
    receiving, while a terminal device is in a screen locking state, a video playing instruction of a user via a screen locking interface of the terminal device; and
    switching, in response to the video playing instruction, from the screen locking interface to a video playing interface displayed according to a video playing program in the screen locking state,
    wherein through the video playing program, a video list is displayed or video data is played in the video playing interface in the screen locking state,
    wherein a control related to user interaction is not displayed in the video playing interface or the control related to user interaction is displayed in the video playing interface and the control related to user interaction is in a disabled state, and
    wherein in response to an authentication success of an authentication request initiated by the user for the video playing interface, the control related to user interaction in the video playing interface is enabled.

2. The display method according to claim 1, wherein the video playing program is a sub-program contained in a screen locking program of the terminal device.

3. The display method according to claim 2, wherein the screen locking program further comprises a video decoding program matched with the video playing program, and the method further comprises:
    decoding to-be-played video data through the video decoding program contained in the screen locking program.

4. The display method according to claim 2, wherein the video list or the video data is acquired by the screen locking program from a video content server based on a unique video service registration identifier of the terminal device.

5. The display method according to claim 4, wherein the screen locking program, through direct communication with the video content server, directly acquires the video list or the video data from the video content server; and/or
    the unique video service registration identifier of the terminal device is assigned to the terminal device by the video content server after determining that authentication of a system application identifier reported by the terminal device has been passed, the system application identifier comprises a unique application identifier assigned to a system application of the terminal device by the video content server, and the screen locking program is contained in the system application.

6. The display method according to claim 4, further comprising:
    synchronizing video browsing or playing information of a video content displayed in the video playing program with video browsing or playing information of the video content stored in the video content server.

7. The display method according to claim 4, further comprising:
    receiving an account association instruction of the user for the video playing interface; and
    in response to the account association instruction, associating a registered account of the user for a third-party video playing program with the unique video service registration identifier of the terminal device,
    wherein the third-party video playing program comprises an application supported by the video content server and different from the system application of the terminal device.

8. The display method according to claim 7, wherein the in response to the account association instruction, associating the registered account of the user for the third-party video playing program with the unique video service registration identifier of the terminal device comprises:
    in response to the account association instruction, calling and displaying a login interface of the third-party video playing program;
    receiving login authentication information which is input into the login interface by the user for the third-party video playing program and corresponds to the registered account; and in response to an authentication success based on the login authentication information, associating the registered account with the unique video service registration identifier of the terminal device.

9. The display method according to claim 8, wherein a control related to user interaction is displayed in the video playing interface, the control related to user interaction is in a disabled state, and the account association instruction is implemented through a user triggering for the control related to user interaction.

10. The display method according to claim 9, further comprising:

in response to the authentication success based on the login authentication information, changing the control related to user interaction from the disabled state to an enabled state; and for the user triggering, performing a response operation related to an interaction function implemented by the control related to user interaction.

11. The display method according to claim 7, further comprising at least one of:

synchronizing user information related to the registered account with user information related to the unique video service registration identifier, the user information comprising at least one type of: user's personal information, user's playing history data for video contents, user's playing behavior information for video contents, user's preference information for video contents, user's preference information for information recommendation contents, or video playing setting information; or synchronizing user interaction data related to the registered account with user interaction data related to the unique video service registration identifier.

12. The display method according to claim 11, wherein the video list displayed or the video data played in the video playing interface and video list displayed or video data played by the third-party video playing program when the user logs in the third-party video playing program based on the registered account are pushed based on same user information.

13. The display method according to claim 7, wherein the video list displayed or the video data played in the video playing interface is pushed based on a general non-personalized parameter, and the user information corresponding to the unique video service registration identifier and/or the user information corresponding to the registered account, wherein a weight of user information on which a push strategy is based in the push strategy after the association is performed is greater than a weight of user information on which the push strategy is based in the push strategy before the association is performed.

14. The display method according to claim 1, wherein the video playing program is the third-party video playing program called by the screen locking program of the terminal device and installed in the terminal device, wherein the third-party video playing program comprises an application supported by the video content server and different from the system application of the terminal device.

15. The display method according to claim 14, wherein in response to the video playing instruction, the switching from the screen locking interface to the video playing interface displayed according to the video playing program in the screen locking state comprises:

in response to the video playing instruction, displaying, over the screen locking interface of the terminal device, the video playing interface displayed according to the third-party video playing program, and covering the screen locking interface; or the third-party video playing program is a video playing program preset to have an authority of allowing the video playing program to be called by the screen locking program for display on the screen locking interface.

16. The display method according to claim 1, wherein the video playing instruction is implemented through a user input for the screen locking interface; or the video playing instruction is implemented in response to a user input for the screen locking interface and a user authentication success; or the receiving the video playing instruction of the user for the screen locking interface comprises: receiving a screen swipe operation of the user for the screen locking interface, and in response to the user authentication success, determining that the video playing instruction of the user for the screen locking interface has been received.

17. The display method according to claim 1, wherein the enabling the control related to user interaction in the video playing interface comprises:

displaying, in the video playing interface, the control related to user interaction not originally displayed; or changing the control related to user interaction from a disabled state to an enabled state.

18. A terminal device, comprising:

a processor; and a memory having therein stored a program, the program comprising instructions which, when executed by the processor, cause the processor to perform the display method according to claim 1.

19. A non-transitory computer-readable storage medium having therein stored a program, the program comprising instructions which, when executed by a processor of an electronic device, cause the electronic device to perform the display method according to claim 1.

* * * * *